United States Patent [19]

Yamamoto

[11] Patent Number: 5,073,395

[45] Date of Patent: Dec. 17, 1991

[54] KONJAK FOOD GELLED BY VEGETABLE JUICE

[76] Inventor: Tokuzo Yamamoto, 10965-3, Yoshino-cho, Kagoshima-shi, Kagoshima 892, Japan

[21] Appl. No.: 670,434

[22] Filed: Mar. 15, 1991

[51] Int. Cl.$^5$ ............................................. A23L 1/0528
[52] U.S. Cl. .................................... 426/573; 426/658
[58] Field of Search ................ 426/573, 575, 578, 658

[56] References Cited

U.S. PATENT DOCUMENTS

| | | | |
|---|---|---|---|
| 4,676,976 | 6/1987 | Toba | 426/654 |
| 4,963,383 | 10/1990 | Nozaki et al. | 426/573 |
| 4,992,291 | 2/1991 | Yamamoto | 426/656 |

FOREIGN PATENT DOCUMENTS

| | | | |
|---|---|---|---|
| 60-16581 | 1/1985 | Japan | 426/573 |
| 149065 | 7/1986 | Japan | 426/573 |
| 3071159 | 3/1988 | Japan | 426/573 |
| 3301758 | 12/1988 | Japan | 426/573 |

*Primary Examiner*—Jeanette Hunter
*Attorney, Agent, or Firm*—Longacre & White

[57] ABSTRACT

An aqueous konjak gel comprising about 3 to 5% by weight of a dry refined konjak flour, a juice obtained from calcium-containing vegetable leaves and calcium hydroxide as a calcium supplementing additive in which a total content of calcium derived from the juice and calcium hydroxide is not less than 0.14% by weight based on water contained in the gel.

The konjak food can be obtained stably and easily and it has no peculiar lime odor.

5 Claims, No Drawings

KONJAK FOOD GELLED BY VEGETABLE JUICE

BACKGROUND OF THE INVENTION

1. Field of the Invention

The present invention concerns konjak food gelled by a vegetable juice and a process for producing such konjak food.

2. Description of the Prior Art

Konjak is a sort of jelly like foods and it has been traditionally produced from konjak tubers by slicing dry tubers into thin chips, grinding the chips into a refined konjak flour, dispersing the thus obtained flour into water and adding an alkaline chemical such as calcium hydroxide to the dispersion, which is then heated and subsequently allowed to cool, to form an aqueous konjak gel.

The konjak gel obtained is almost tasteless and has a translucent milky color. Regarding it composition, it contains a great amount of fibrous substances (so-called dietary fibers) and has been stressed by dietitians nowadays as low caloric and health-keeping food.

As described above, since konjak is tasteless and has a dull color appearance it is in sharp contrast with the attractive presentation widely sought and enhanced in new products in compliance with contemporary nutrition feelings and tastes. Therefore, konjak is not so favored as ordinary food but its use is rather limited as an additive to foods and beverages with dietetic qualities and purposes.

A further handicap in the commercialization of konjak originates from the odor of the konjak gel. Whereas the konjak itself has no substantial specific odor, its releases a peculiar unappealing odor after gelation with calcium hydroxide (lime).

It may be considered to reduce the amount of calcium hydroxide added. However, this attempt is very limited due to the risk of affecting the gelification process itself. About 0.4% by weight of calcium hydroxide (about 0.2% by weight converted as Ca) based on water present in the final gel is necessary for obtaining a satisfactory gel and, if it is reduced, for example, by about 25%, commercially acceptable konjak food can be produced no more.

In my prior patent application, directed to the production of tofu and like other soybean food and now allowed as U.S. Pat. No. 4,992,291, I have succeeded in replacing magnesium chloride used so far as a gelling agent with a liquid extract from vegetable leaves.

However, it could not be expected that my discovery mentioned above regarding the production of tofu be applicable to the production of konjak gel because of the following reasons.

The production processes for tofu seems to be similar to that of konjak since a gelation step by an alkaline chemical is conducted for each of them. However, gelation takes place for bean protein by using magnesium chloride in the case of tofu. On the other hand, konjak glucomannan (a sort of polysaccharides) is at first hydrolyzed into glucose and mannose by calcium hydroxide which are then coagulated by crosslinking and complex reactions under a catalytic effect of calcium. Accordingly, mechanisms of chemical reactions are quite different between them.

In addition, gelling conditions for konjak are much more delicate then those for tofu. Indeed, preparation of konjak actually fails sometimes even in a traditional process using lime and they say that this is mainly attributable to accidental inclusion of a trace amount of impurities such as starch, salt, etc. during the production process.

Therefore, I was rather negative to use a vegetable juice as a substitute for a gelling chemical in the production of konjak because the vegetable juice contains various known and unknown substances which would give undesired effects on the gelling process.

OBJECT OF THE INVENTION

It is, accordingly, an object of the present invention to provide konjak with no peculiar odor caused by the addition of calcium hydroxide as a gelling agent.

It is another object of the present invention to provide konjak with the content of calcium hydroxide as a gelling agent being reduced as low as possible.

A further object of the present invention is to provide a process for producing konjak with less addition of calcium hydroxide (lime) and, thus, free from peculiar odor in a final product.

SUMMARY OF THE INVENTION

The foregoing objects of the present invention can be attained in an aqueous konjak gel comprising about 3 to 5% by weight of a dry refined konjak flour, a juice obtained from calcium-containing vegetable leaves and calcium hydroxide as a calcium supplementing additive in which a total content of calcium derived from the juice and calcium hydroxide is not less than 0.14% by weight based on water contained in the gel.

The aqueous konjak gel as described above can be obtained by a production process, which comprises dispersing about 3 to 5% by weight of a dry refined konjak flour prepared from konjak tubers by slicing the tubers into thin chips, grinding the thus obtained chips and dry sieving them, stirring the thus obtained aqueous dispersion under heating at 40° to 50° C. to obtain a viscous liquid, adding calcium hydroxide to the liquid in such an amount as providing not less than 0.14% of calcium derived from said vegetable juice and calcium hydroxide based on water in said liquid, and then, allowing them to rest for coagulation.

It has, surprisingly, been found that an aqueous dispersion of the refined konjak flour can be gelled stably and easily by adding the juice obtained from vegetable leaves containing calcium, even if the content of calcium hydroxide is greatly reduced from that required in a traditional gelling step. For example, an intact konjak gel can be obtained with addition of calcium hydroxide only by about 1.5% (about less than one-half of the usual amount) and peculiar lime odor is no more sensed at all in this case, so long as the total calcium content derived from calcium hydroxide and the vegetable juice is within the above mentioned range.

It has further been found that konjak can be gelled even when it contains slightly less total calcium content than that theoretically required in the traditional step. Although the reason for this not clear at present, I suppose this might be due to the presence of various kinds of polysaccharides contained in the vegetable juice, which produces a synergistic gel protecting effect.

In an extreme case, a konjak gel can be prepared by using the vegetable juice alone, although it shows somewhat lower gel consistency as compared with that of commercial products.

The range for the content of the dry refined konjak flour, that is, from 3 to 5% by weight based on water is substantially the same as that used in the traditional method.

The amount of the vegetable juice added to water is optional and it may be selected depending on the kind, odor, taste or like other factor which will give an effect on the quality of the konjak food obtained.

Generally, it is preferred to use from 10 to 15% by weight of the juice based on water in the gel.

Once the amount of the juice is thus decided, the content of calcium therein is determined, which determines the quantity of synthetic calcium hydroxide and it is added so as to reach the indicated level as described above.

Since it is desirable to reduce the amount of lime as low as possible, it is preferred to use vegetables having a high calcium content in the present invention.

In the first place vegetables belonging to the plant family of Brassica can be mentioned. They include, for example cabbage, Chinese cabbage, mustard, komatsuna, radish and nozawana. Cabbage is preferred since it gives a pale color and a faint refreshing odor to the konjak gel. Under leaves of cabbage are peculiarly preferred since they contain relatively high calcium content (300 mg Ca/100 g in average).

In addition vegetables of other plant families can also be used such as Labiatac, for example, basil and Solanaccac, for example, red pepper.

It has been found that when 200 cc of a juice obtained from lower leaves of cabbage was used to 1 liter of water, it was sufficient to obtain an expected gelation. The calcium content in this case is less than the above mentioned required amount. Therefore, we have assumed that organic calcium compounds in cabbage are superior to synthetic calcium hydroperoxide in their effect and permit substantial reduction of calcium needed.

In the present invention, the total content of calcium has been reduced and cabbage, for example, left only a faint odor comparable to a light smell of "matcha" (Japanese tea), allowing also the use of additional flavors with no depreciation of their genuine qualities.

Accordingly, the use of cabbage seems to be most appropriate to the purpose of the present invention, since I wish to avoid unnecessary modifications of the popular konjak. Moreover cabbage is a popular vegetable readily available.

The process for producing konjak gel according to the present invention can be conducted more easily than the traditional method.

In the usual process calcium hydroxide was added divisionally and excessively, i.e., in the first hydrolyzing step and in the latter coagulation step and excess lime was leached out in the finishing step. Thus, the entire production process was rather complicate.

On the other hand, in the process of this invention, after dispersing the refined konjak flour together with the vegetable juice into water, calcium hydroxide just for the required content is added only for once.

In addition, gelling always occur stably and reliably. It is assumed that polysaccharides contained in the vegetable juice assist the gelation and protects the once-formed gel.

For enhancing the effect, colloid-protecting agents can be added.

Preferred colloid protecting agents used in the present invention can include methyl cellulose, carboxy methyl cellulose, methyl starch, carboxy methyl starch, delta gluconolactone, sodium triphosphate, sodium alginate, carrageenan and agar. They may be added alone or as a mixture of them.

A preferred amount of the colloid-protecting agent used is about from 0.1 to 0.2% by weight based on water in the konjak gel.

The present invention will now be illustrated more in details referring to examples.

EXAMPLE 1

300 cc of a juice obtained from outer green leaves of cabbage, 80 grams of a refined konjak flour and 2 liters of water were mixed at a temperature of 40° C. and stirred for 5 to 6 minutes. One gram of synthetic calcium hydroxide was added and mixed thoroughly and then left to rest for 30 to 40 minutes until gelation. A coagulated mass was then poured into water at 80° C. and boiled for 15 minutes. Gelation was completed and the konjak gel was allowed to cool down. The thus obtained konjak gel had an appropriate elasticity and a green color. Its odor was not unpleasant but rather reminded the fragrance of green tea, with a light and sweet touch of cabbage. When left for 3 days in this stage, it lost some of its water, so that its shape became less stiff. As an improved process, when about one gram of deltagluconolacton was added in the gelling step, the shape of konjak gel did not change even after one week.

EXAMPLE 2

300 cc of a juice obtained from inner white leaves of cabbage (45 mg Ca/100 g), 80 grams of refined konjak flour, 2 grams of carrageenan and 2 liters of a water were mixed at a temperature of 40° C. and stirred for 5 to 6 minutes. When the mixture was left to rest for 30 to 40 minutes, the liquid mixture became viscous. Then, 2.5 grams of calcium hydroxide was added and stirred to obtain a gel, which was then poured into water at 80° C. and kept for 15 minutes. The konjak gel was allowed to cool down. The so obtained konjak had a light green color and it was free of any particular smell, whereas its consistency as well as its taste differed in no way from the traditional konjak gel.

EXAMPLE 3

200 cc of a juice obtained from leaves of chinese cabbage (33 mg Ca/100 g) and 100 cc of a juice obtained from leaves of basil (220 mg Ca/100 g), 80 grams of a refined konjak flour and 2 liters of water were mixed at a temperature of 40° C. and stirred for 5 to 6 minutes. Two grams of synthetic calcium hydroxide as well as 2 grams of agar were added and mixed thoroughly and the mixture was left to rest for 30 to 40 minutes until gelation. The coagulated mass was then poured into water at 80° C. for 15 minutes. The thus gelled konjak was allowed to cool down. This kind of konjak had a red transparent color like the leaves of basil and its taste also revealed the presence of basil. Its consistency was lightly softer than the traditional konjak gel.

EXAMPLE 4

200 cc of a juice obtained from outer leaves of cabbage, 100 cc of a juice obtained from pimento (640 mg Ca/100 g) were used and processed in the same way as in Example 1, excepting that the quantity of synthetic calcium added was 0.6 grams and 2 grams of carrageenan were added. The konjak obtained in this case reminded the taste of pimento and its consistency was somewhat stiffer.

What is claimed is:

1. An aqueous konjak gel comprising about 3 to 5% by weight of a dry refined konjak flour, a juice obtained from calcium-containing vegetable leaves and calcium hydroxide as a calcium supplementing additive, in which a total content of calcium derived from said juice and calcium hydroxide is not less than 0.14% by weight based on water contained in the gel.

2. An aqueous konjak gel as defined in claim 1, wherein the juice is obtained from leaves of vegetables selected from the group consisting of to Brassica, Solanaceae and Labiatae.

3. An aqueous konjak gel as defined in claim 2, wherein the vegetable is cabbage.

4. An aqueous konjak gel as defined in claim 1, wherein the aqueous gel contains a colloid-protecting agent selected from the group consisting of methyl cellulose, carboxymethyl cellulose, methyl starch, carboxy methyl starch, delta gluconolactone, sodium triphosphate, sodium alginate, carrageenan and agar.

5. A process for producing an aqueous konjak gel, which comprises:

dispersing about 3 to 5% by weight of a dry refined konjak flour prepared from konjak tubers by slicing the tubers into thin chips, grinding the thus obtained chips and sieving them, and a juice obtained from leaves of a calcium-containing vegetable.

stirring the thus obtained aqueous dispersion under heating at 40° to 50° C. to obtain a viscous liquid.

adding calcium hydroxide to said liquid in such an amount as providing not less than 0.14% of calcium derived from said vegetable juice and calcium hydroxide based on water in said liquid, and then, allowing them to rest for coagulation.

* * * * *